United States Patent [19]

Matsuoka

[11] Patent Number: 5,309,488

[45] Date of Patent: May 3, 1994

[54] EMERGENCY REACTOR COOLANT ACCUMULATOR

[75] Inventor: Tsuyoshi Matsuoka, Tokyo, Japan

[73] Assignee: Mitsubishi Jukogyo Kabushiki Kaisha, Tokyo, Japan

[21] Appl. No.: 965,951

[22] Filed: Oct. 26, 1992

[51] Int. Cl.$^5$ .............................................. G21C 15/18
[52] U.S. Cl. ................................................... 376/282
[58] Field of Search ......................... 376/282, 283, 307

[56] References Cited

U.S. PATENT DOCUMENTS

| | | | |
|---|---|---|---|
| 3,865,688 | 2/1975 | Kleimola | 376/283 |
| 3,981,770 | 9/1976 | Middleton | 376/282 |
| 4,046,626 | 9/1977 | Winkler et al. | 376/282 |
| 4,064,002 | 12/1977 | Desmarchais et al. | 376/282 |
| 5,085,825 | 2/1992 | Gluntz et al. | 376/282 |

*Primary Examiner*—Daniel D. Wasil
*Attorney, Agent, or Firm*—Jacobson, Price, Holman & Stern

[57] ABSTRACT

An emergency reactor coolant accumulator has a depressurizer to depressurize the accumulator at an appropriate timing, thereby preventing the flow of accumulator gas into the reactor system. If an accident occurs in the reactor system and the pressure of the reactor system decreases, the accumulator water (19) in the accumulator body (11), which is pressurized by the accumulator gas (18) is injected into the reactor system through the accumulator water outlet line (12) via the check valve (13) to cool the reactor core, and at the same time, the accumulator water (19) in the accumulator body (11) is introduced into the depressurizing vortex damper body (21) through the lower inlet (21c) of the damper (21) in the tangential direction to form a vortex. The increase in resistance due to the vortex reduces the amount of water discharged from the accumulator body (11) to the gas release line (22) via the depressurizing vortex damper (21). When the water level of accumulator water (19) drops below the lower inlet (21c) of the depressurizing vortex damper (21), the accumulator gas (18) enters into the depressurizing vortex damper body (21) through the top inlet (21b) and the lower inlet (21c) and is released out of the reactor system through the gas outlet (21d) and the gas release line (22).

8 Claims, 7 Drawing Sheets

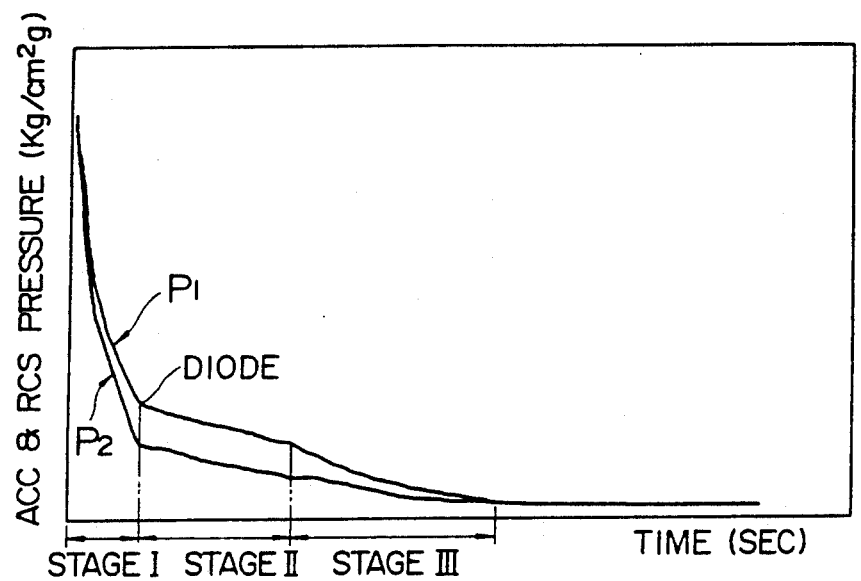
F I G. 9(a)
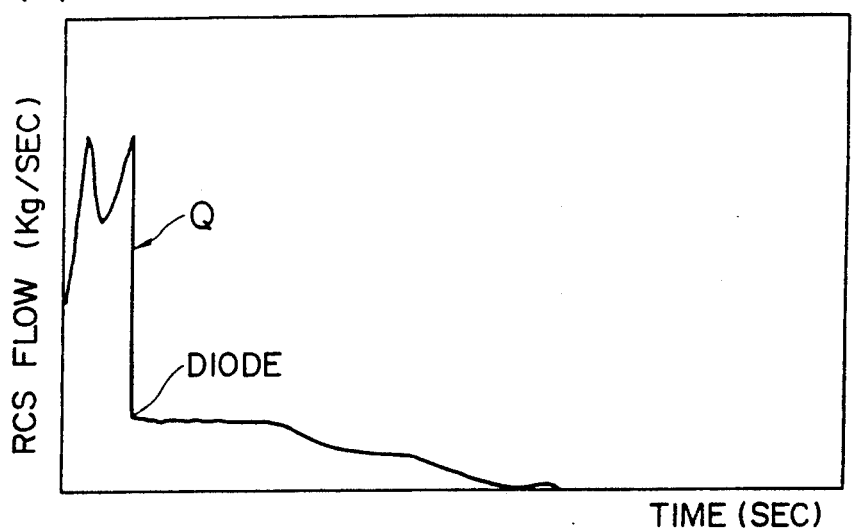
F I G. 9(b)

5,309,488

EMERGENCY REACTOR COOLANT ACCUMULATOR

BACKGROUND OF THE INVENTION

This invention generally relates to an emergency reactor coolant accumulator for an emergency reactor core cooling system in a nuclear power plant and more particularly to an emergency reactor coolant accumulator typically used in a pressurized light water reactor (PWR).

A typical emergency reactor core cooling system conventionally used includes various kinds of hydraulic lines and components such as valves, borated water storage tanks, pipes, pumps, spray nozzles and so on.

An emergency reactor coolant accumulator in which an accumulator tank contains a borated water under pressurization by a compressed gas such as nitrogen gas i one of the most familiar components includes in the emergency core cooling system before-mentioned. A typical accumulator is generally shown in FIG. 10. In the drawing, a tank 1 communicates with a primary reactor cooling loop (not shown) through a water injection line 2 provided with a check valve 3. The accumulator tank 1 also communicates, at an upper region, with a compressed gas supply source (not shown) through a gas inlet line 4 provided with an on-off valve 5. A compressed gas such as nitrogen is introduced into a gas plenum 8 at an upper region when the valve 5 is open, while the valve 5 is kept closed in the normal operation of a nuclear power plant thereby maintaining a pressurized condition of a predetermined pressure in the tank 1.

On the other hand, an emergency reactor coolant such as a borated water is supplied into the tank 1 through a water inlet line 6 when a supply valve 7 is opened and an accumulator borated water 9 is held under such pressurized condition as before-described in the normal operation of the nuclear plant.

In the normal operating condition, a pressure in the accumulator tank 1 is maintained at a predetermined degree lower than that in the primary reactor cooling loop thereby keeping the check valve 3 in a closed condition.

If a leakage or breakdown occurs in the primary reactor cooling loop, for example, as a credible accident, a pressure in the primary cooling loop decreases thereby causing the check valve 3 to open. Under such an accidental condition, the accumulated water 9 in the tank 1 is driven, under the pressure of the compressed nitrogen gas, into the primary cooling loop through the water injection line 2 so as to cool a nuclear core in a reactor vessel communicating with the primary cooling loop.

Accordingly, as the accumulator water 9 continues to flow out of the tank in such a manner, the level of the water comes down with the expansion of the gas and a decrease in the pressure thereof. It is desirable to keep the pressure of the gas as high as possible so as to inject a remaining water into the loop without delay when the level of the water 9 comes down near the bottom of the tank 1 and the inlet of the injection line 2. There is a risk, however, that some of the gas may flow out together with the water thereby giving undesirable effects to the cooling of the nuclear core.

BRIEF SUMMARY OF THE INVENTION

An object of this invention is to provide an emergency reactor coolant accumulator in which all of the accumulator reactor coolant is surely supplied into a primary reactor cooling loop without accompanying gas.

Another object of this invention is to provide an emergency reactor coolant accumulator which can accommodate an emergency reactor coolant under a relatively higher pressure and release an accumulator gas at an appropriate time in a last stage of an injection of the emergency reactor coolant.

Another object of this invention is to provide an emergency reactor coolant accumulator in which a compressed gas accumulator can be released at the best timing predetermined without any delay and/or premature release.

With these objects in view, according to this invention, an emergency reactor coolant accumulator including an accumulator tank capable of accommodating a reactor coolant such as a borated water as well as a compressed gas such as nitrogen gas has a gas damper which can be opened at a predetermined timing so as to release an accumulator gas out of the tank. The gas damper is opened in a last stage of the injection of the borated water into a primary reactor cooling loop so as to release the accumulator gas out of the tank thereby preventing the gas from flowing into the cooling loop together with the borated water. Owing to the gas damper, the initial pressure of the accumulator gas can be set at a relatively higher value so as to surely purge the borated water into the primary reactor cooling loop and supply it to the nuclear core.

According to a preferred embodiment of this invention, a vortex fluid diode is employed as the gas damper. As appreciated by those skilled in the art, the vortex fluid diode has a casing defining a vortex chamber therein, a central opening communicating with a gas release line arranged out of the tank, a gas inlet open above a level of the water through a vertical pipe and a water inlet usually open below the water level.

When the water inlet is below the water level, water flows into the casing through the water inlet and a vortex flow of the water closes the as inlet. On the other hand, when the water level drops below the water inlet as the injection of the water processes, no water flows into the casing thereby communicating the gas inlet with the central opening. Thus, the accumulator gas is released at the predetermined height of the water level without any control unit or other means.

BRIEF DESCRIPTION OF THE DRAWING

FIGS. 9a and 9b are graphs illustrating the operation of the accumulator shown in FIG. 8.

DETAILED DESCRIPTION OF PREFERRED EMBODIMENTS

The embodiments of this invention will be described with reference to the accompanying drawings.

Figure 1:
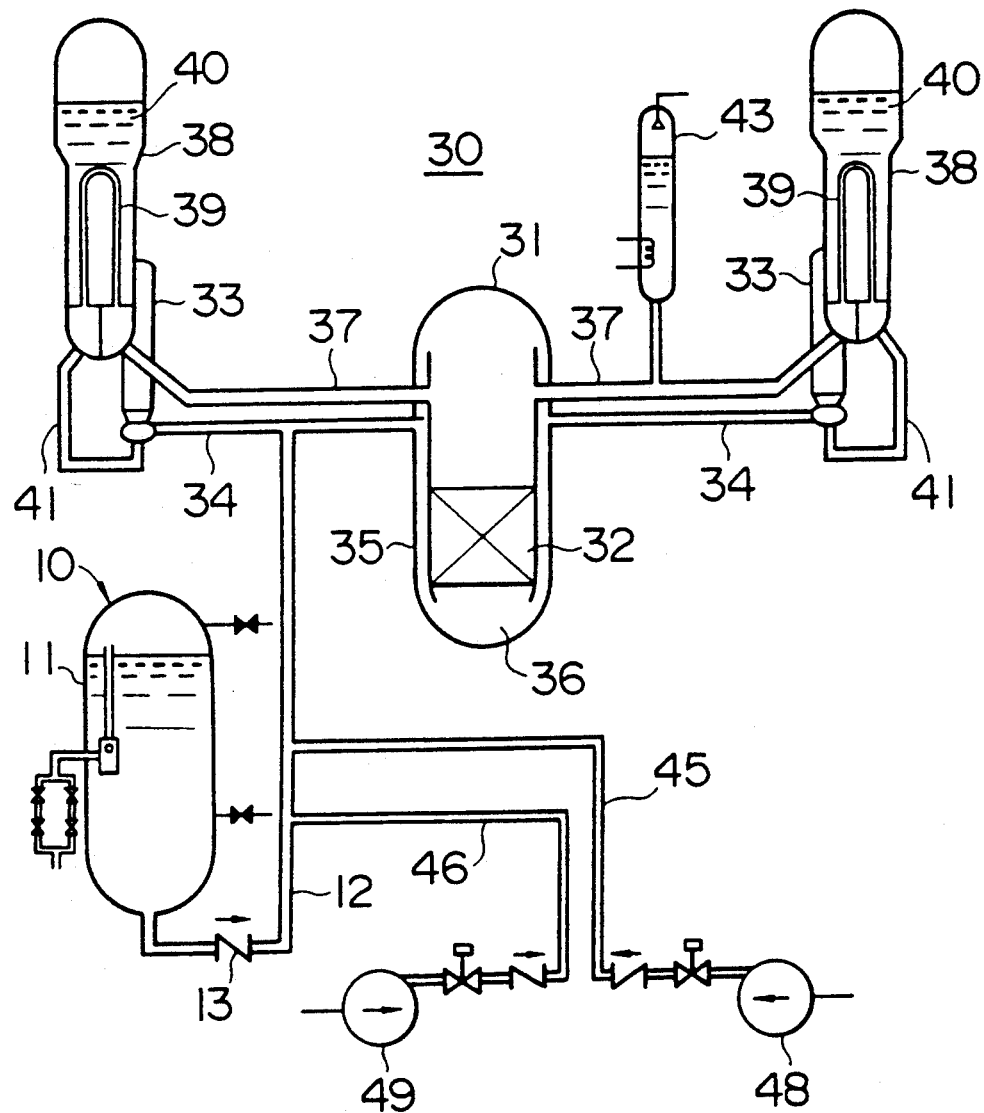
FIG. 1 is a schematic view of a nuclear reactor system to which this invention is applied.

FIG. 1 schematically shows a reactor core cooling system (RCS) 30 for a pressurized light water reactor including an emergency reactor coolant accumulator (ACC) 10 according to this invention. A nuclear core 32 in a reactor vessel 31 is cooled by a rector coolant flowing through a cold leg pipe 34 via a reactor coolant pump 33. The reactor coolant flowing from a coolant nozzle goes down through a down comer 35, turns upward at a lower plenum 36, and flows into the nuclear core 32, wherein the reactor coolant cools the nuclear core 32. Then, the reactor coolant flows to a hot leg pipe 37.

The reactor coolant, which flows from the hot leg pipe 37 to a steam generator 38, passes through many heat transfer tubes 39 to heat the feed water 40 supplied as a shell side fluid. Then, the rector coolant flows to a pipe 41 and returns to the reactor coolant pump 33.

During the operation of the reactor, the reactor coolant flows as described above. The pressure foe this flow is appropriately maintained usually by a pressurized 43 having a heater and a spray nozzle.

The coolant injection pipe 12 attached to the bottom of a tank 11 of accumulator 01 is connected to the cold leg pipe 34 of the primary rector cooling loop via a check valve 13. A high-pressure injection system 45 and a low-pressure injection system 46, which compose a multiple emergency cooling system, are also connected to the coolant injection pipe 12.

The high-pressure injection system 45 and the low-pressure injection system 46 have a high-pressure injection pump 48 and a low-pressure injection pump 49, respectively and are connected to a not illustrated emergency cooling water storage tank. The emergency coolant in the tank 11 and the emergency cooling water in the storage tank are usually light water, being injected in the event of loss of coolant accident as described above. The reactor coolant is also light water.

Figure 2:
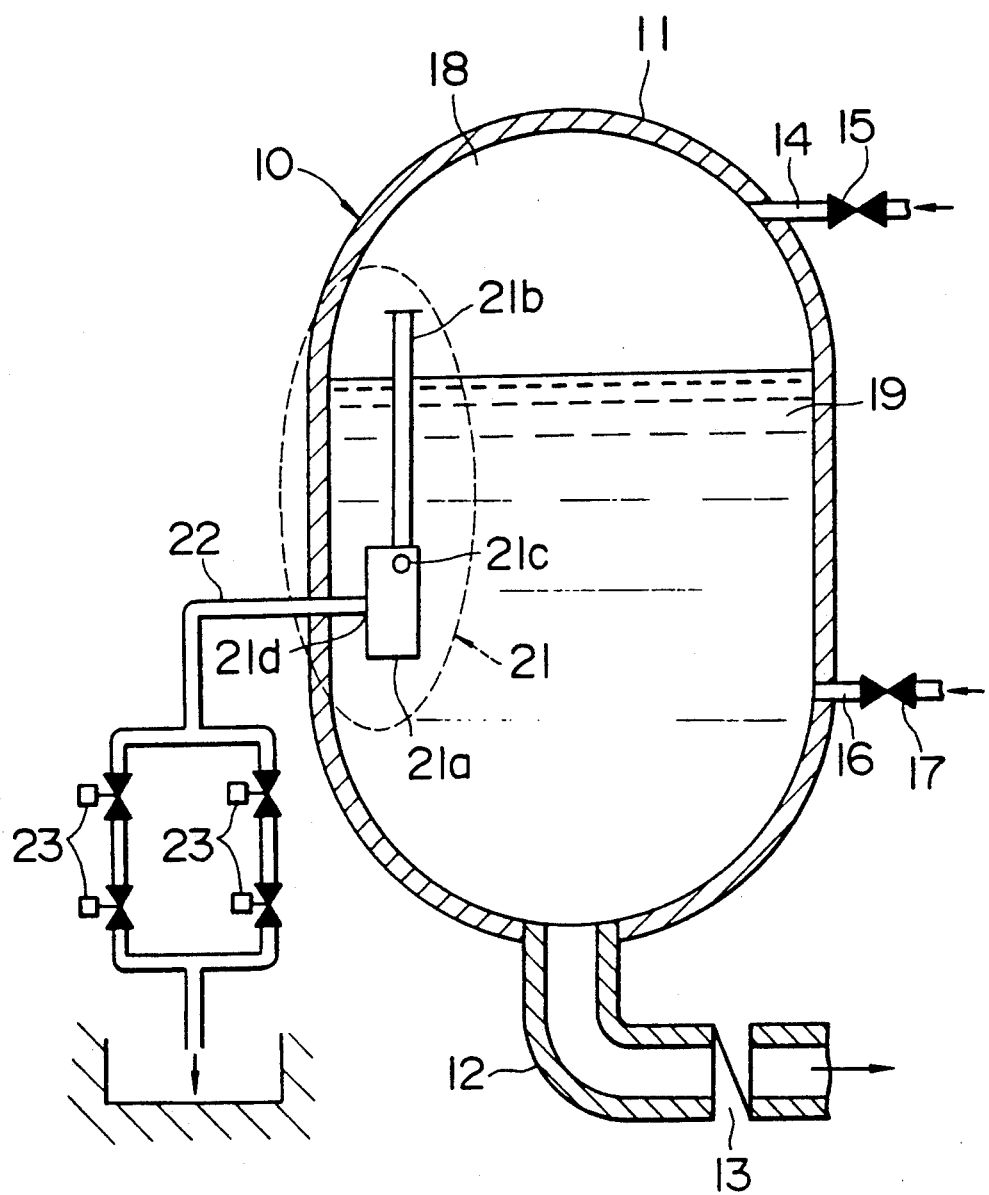
FIG. 2 is a longitudinal cross sectional view of an embodiment of an accumulator of this invention.
Figure 3:
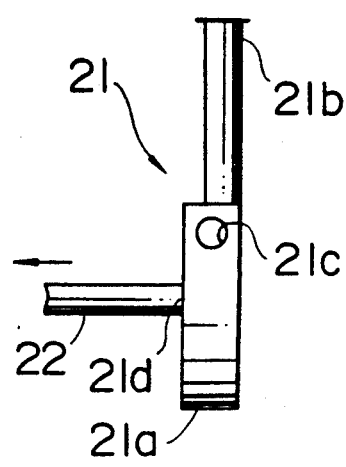
FIG. 3 is a side elevational view of a depressurizing vortex damper.
Figure 4:
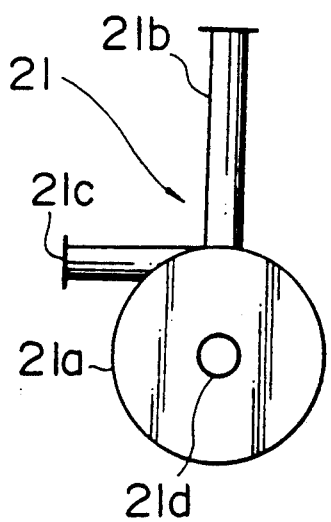
FIG. 4 is a front elevational view of the depressurizing vortex damper of FIG. 3.

FIG. 2 is an expanded view showing the construction of the accumulator 10.

The accumulator of this embodiment will be described with reference to FIGS. 2 through 6. Reference numeral 11 denotes an accumulator body, 12 denotes an accumulator water outlet line extending to a reactor system (not shown in FIG. 2), 13 denotes a check valve installed halfway in the accumulator water outlet line 12, 14 denotes a gas inlet line, 15 denotes a gas inlet valve installed halfway in the gas inlet line 14, 16 denotes an accumulator water inlet line, 17 denotes an accumulator water inlet valve installed halfway in the accumulator water inlet line, 18 denotes an accumulator gas (pressurized gas, such as nitrogen gas) in the accumulator body 11, and 19 denotes an accumulator water in the accumulator body 11.

Reference numeral 21 denotes a depressurizing vortex damper, which is most characteristic of this invention. The damper 21 is installed in the accumulator body 11. The depressurizing vortex damper 21 comprises a depressurizing vortex damper body 21a, a top inlet 21b, a lower inlet 21c, and a gas outlet 21d.

Reference numeral 22 denotes a gas release line connected to the gas outlet 21d of the depressurizing vortex damper. Gas release valves 23 are disposed in parallel branch lines installed halfway in the as release line 22.

Next, the operation of the accumulator shown in FIGS. 2 through 6 will be described.

The accumulator body 11 contains the accumulator gas 18 and the accumulator water 19. Comparing the pressure in this accumulator body 11 with that of the reactor system, the latter is higher, and the accumulator is isolated from the reactor system by the check valve 13.

If the pressure of the reactor system deceases in the event of accident of the reactor system, the accumulator water in the accumulator body 11, which is pressurized by the accumulator gas 18, in injected into the reactor system through the accumulator water outlet line 12 via the check valve 13, thereby cooling the reactor core.

Figure 5:
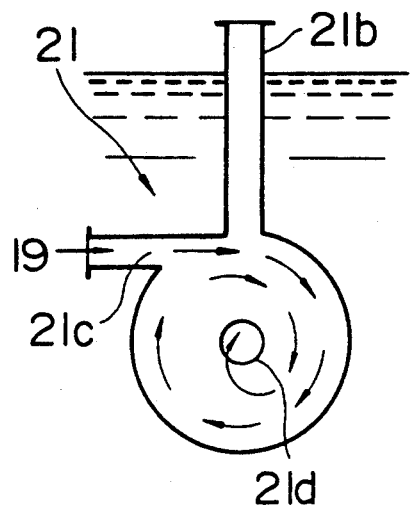
FIG. 5 is a radial cross sectional view of the depressurizing vortex damper of FIG. 4 showing its operation where accumulator water flows into it.

In this process, the accumulator water 19 in the accumulator body 11 enters the depressurizing vortex damper body 21a through eh lower inlet 21c in the tangential direction as indicated by the arrows of solid line in FIG. 5, by which a vortex is formed. The increase in resistance due to the vortex reduces the quantity of water discharged from the accumulator body 11 to the gas release line 22 through the depressurizing vortex damper 21, whereas there is substantially no release of accumulator gas. The discharged water is ineffective; therefore, design is made so as to minimize the quantity of this discharged water.

Figure 6:
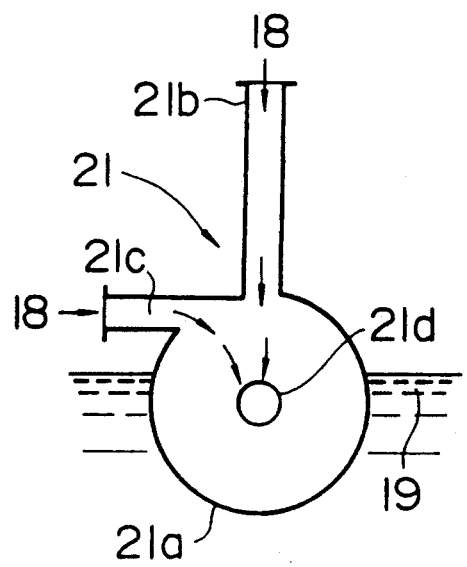
FIG. 6 is a view similar to FIG. 5 showing operation of the damper where accumulator gas flows into it.

The accumulator gas 18 in the accumulator body 11 expands and its function ends as the injection of the accumulator water 19 proceeds. The level of accumulator water 19 lowers below the lower inlet 21c of the depressurizing vortex damper 21 as shown in FIG. 6. Under this condition, the accumulator gas 18 enters into the depressurizing vortex damper body 21a through the top inlet 21b and the lower inlet 21c. The gases entering through the two inlets join and are released out of the reactor system through the gas outlet 21d and the gas release line 22.

In the embodiment shown in FIG. 2, the core injection characteristic of the accumulator water 19 changes at the time when the water level of accumulator water 19 drops to the lower inlet 21c of the depressurizing vortex damper 21.

Figure 7A:
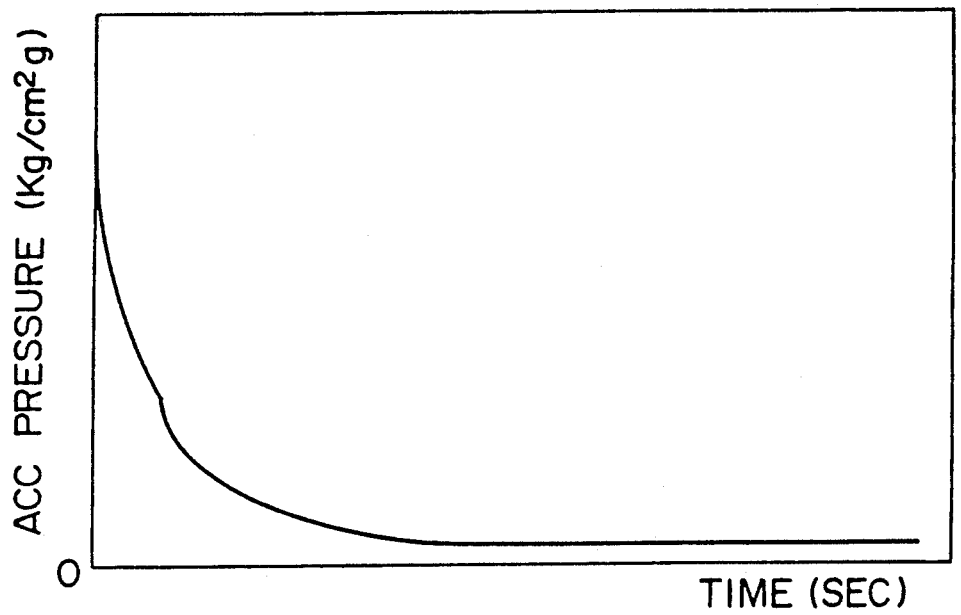
FIGS. 7a and 7b are graphs illustrating the operation of the accumulator shown in FIG. 2.
Figure 7B:
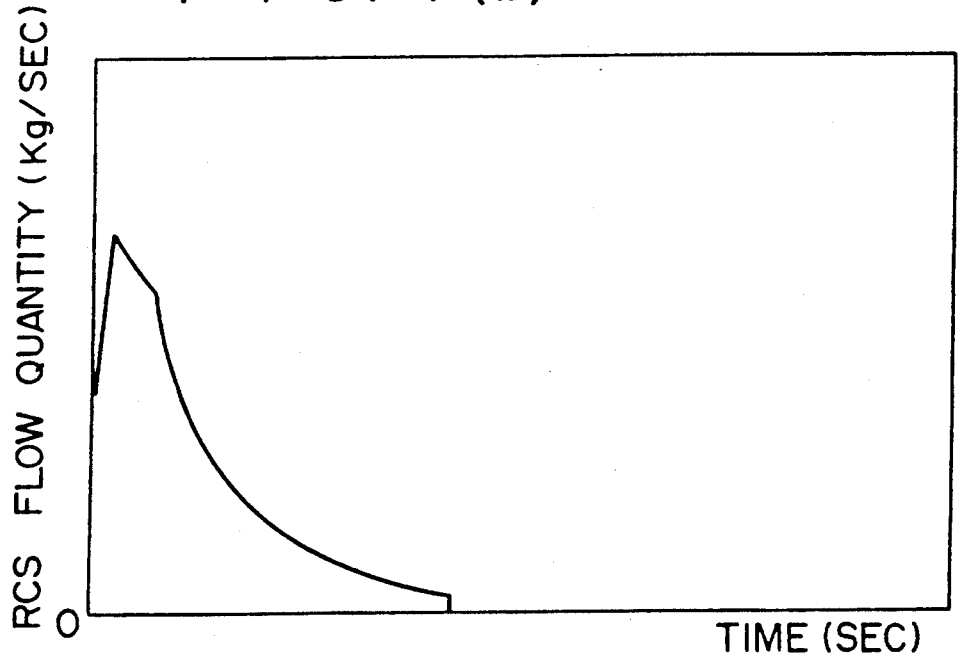

As shown in FIG. 7a, the curve at A shows the starting point of high-volume gas release via the depressurizing vortex damper when the water level drops to the lower inlet 21c of the damper, the curve showing the pressure in the accumulator. FIG. 7b shows a curve of the flow rate of the accumulator water from the accumulator to the reactor core cooling system (RCS). Point B on the curve shows the starting point of the high-volume gas release via the depressurizing vortex damper, when the water level drops to the lower inlet of the damper.

Figure 8:
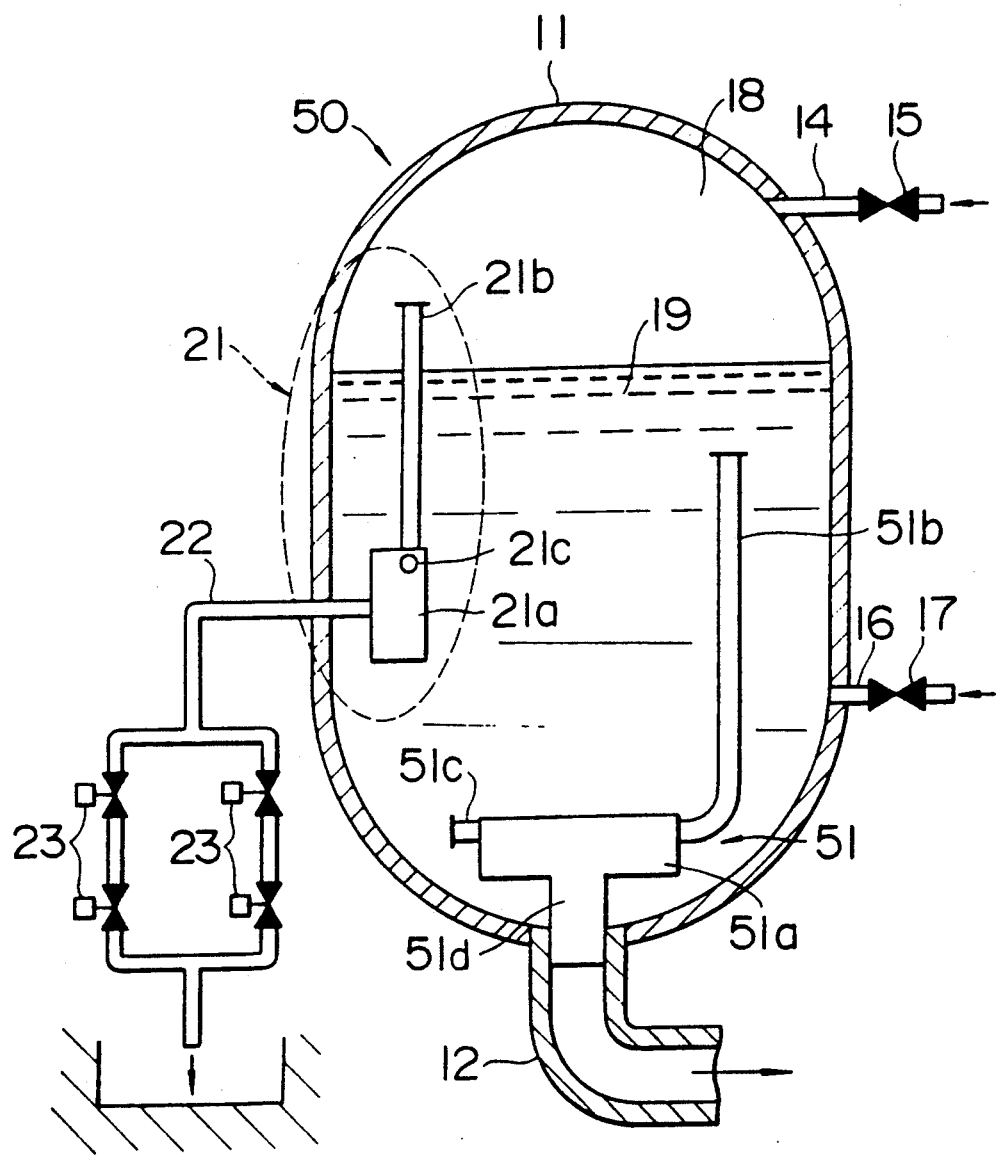
FIG. 8 is a longitudinal cross sectional view of another embodiment of accumulator of this invention.
Figure 10:
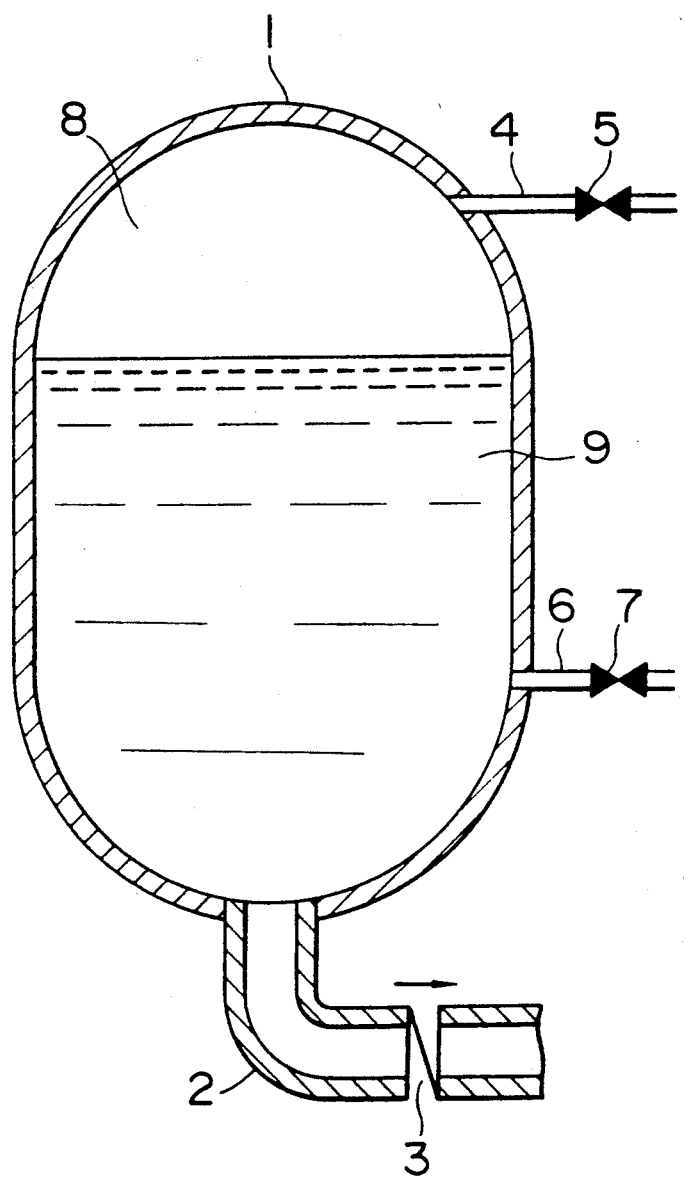
FIG. 10 is a longitudinal cross view of an example of a conventional accumulator.

FIG. 8 shows another embodiment of this invention. As seen from the figure, the constitution of the reactor core cooling system (RCS) is the same as that described in the above embodiment; therefore, the description thereof is omitted.

The accumulator (ACC) 50 of this embodiment has the same construction as that of the accumulator 10 shown in FIGS. 1 and 2, except that the accumulator 50 has a vortex diode 51 at the inlet portion of the coolant injection pipe 12. Like reference numerals designate like parts, and the description thereof is omitted.

In FIG. 8, which is an expanded view showing the construction of the accumulator 50, the central outlet pipe 51d of a casing 51a of the vortex diode 51 is connected to the inlet of the injection pipe 12, and a rise pipe 51b extending from the casing 51a is open at a position above the gas damper 21. A vortex fluid inlet 51c is open at a relatively low portion. This vortex diode 51 provides a multi-stage injection characteristic of emergency coolant i.e. borated water 19 to meet the requirement described below. For example, if a loss of coolant accident occurs, a large amount of borated water 19 must be injected at the start of injection to cover the exposed nuclear core 32 with water again; however, after the nuclear core has been covered with water, it is sometimes required to supply borated water at a low flow rate for a long period of time to replenish the coolant to provide against the leakage of water at a broken place.

The operation of the accumulator 50 will e described with reference to FIGS. 8 and 9. In the normal operation of reactor, the borated water 19 supplied from the water inlet line 16 maintains a predetermined water level, whereas the nitrogen gas supplied from the gas inlet line 14 to a gas plenum 18 keeps the pressure at a predetermined value. At this time, the release valves 23 on the gas release line 22 are closed. Under this condition, for example, if a break occurs on the hot leg pipe 37, the coolant flows out from that potion, resulting in a decrease in pressure of the reactor core cooling system 30; the pressure becomes lower than that of the tank 11. The change of pressure difference opens the check valve 13, so that the borated water 19 is injected to the cold leg pipe 34 through the injection pipe 12 to cool the nuclear core 32. At this time, the gas release valves 23 are open. However, the water flowing through the lower inlet 21c of the gas damper 21, which is a vortex fluid diode, produces a vortex in the casing 21a, cutting off the communication between the gas release line 22 and the vertical pipe 21b.

In the vortex diode 51, the borated water flows into the vortex diode through both the rise pipe 51b and the vortex fluid inlet 51c; therefore, no vortex occurs in the casing 51a, resulting in a water flow of a relatively high flow rate.

FIG. 9a shows an example of the change in pressure $P_1$ in the accumulator, and pressure $P_2$ in the reactor core cooling system. FIG. 9b shows the injection flow rate Q of borated water 19 to the reactor core cooling system. The before-described condition is designated by Stage I in FIG. 9.

When the water level of borated water 19 lowers below the top opening of the rise pipe 51b, there is no water flowing into the vortex diode 51 through the rise pipe 51b; water enters into the vortex diode 51 through the vortex fluid inlet 51c only. Therefore, a vortex occurs in the casing 51a, so that the resistance due to the vortex increases, resulting in low injection flow rate Q.

The condition of the gas damper 21 does not change; only a small amount of water flows through the gas release line 22, and nitrogen gas is not released. The vortex fluid diode used as the gas damper 21 is designed so that the quantity of discharged water is minimized. This condition is designated by Stage II.

When the water level of the borated water 19 lowers below the lower inlet 21c of vortex fluid diode 21, no vortex of water occurs as described above, so that the vertical pipe 21b communicates with the gas release line 22. Therefore, the compressed nitrogen gas 18 in the tank 11 begins to be released through the gas release line 22, promoting the decrease in internal pressure $P_1$. As a result, the difference between internal pressure $P_1$ and pressure $P_2$ in the reactor core cooling system decreases; as a result, the force for pushing out the borated water 19 decreases and in turn the injection flow rate Q deceases further. This condition is indicated by Stage III in FIG. 9.

Thus, when the remainder of borated water 19 flow from the vortex diode 51, the gas pressure decreases, so that gas does not flow into the injection pipe 12 together with the water.

In the embodiment shown in FIG. 8, an outlet vortex damper 51 is disposed at the lower part in the accumulator body 11. When the water level of accumulated water 19 comes down to the lower inlet 51c of the outlet vortex damper 51 or when it comes down to the lower inlet 21c of the depressurizing vortex damper 21, the core injection characteristic of the accumulator water 19 changes.

Even if the gas release valves 23 are opened due to misoperation or failure of equipment, a vortex occurs, so that the increase in resistance reduces the quantity of water discharging from the depressurizing vortex damper 21 to the gas release line 22. Therefore, the check of failure and the closing of valve can be performed while replenishing the water of discharged amount without stopping the plant. Thus, the operation rate of the plant is enhanced.

In the accumulator according to this invention, if an accident occurs in the reactor system and the pressure of the reactor system decreases, the accumulator water in the accumulator body, which is pressurized by the accumulator gas, is injected into the reactor system through the accumulator water outlet line via the check valve to cool the reactor core, and at this same time, the accumulator water in the accumulator body is introduced into the depressurizing vortex damper body through the lower inlet of the damper in the tangential direction to form a vortex. The increase in resistance due to the vortex reduces the quantity of water discharged from the accumulator body to the gas release line via the depressurizing vortex damper. When the water level of accumulator water lowers below the lower inlet of the depressurizing vortex damper, the accumulator gas enters into the depressurizing vortex damper body through the top inlet and the lower inlet and is released out of the rector system through the gas outlet and the gas release line. Therefore, the accumulator can be depressurized at an appropriate timing, thereby preventing the flow of accumulator gas into the reactor system.

I claim:

1. An emergency reactor coolant accumulator for a primary reactor having a primary reactor cooling loop comprising:
   an accumulator tank having a bottom portion;
   an accumulator coolant injection pipe connected between said bottom portion of said accumulator tank and said primary reactor cooling loop;
   a check valve in said accumulator coolant injection pipe for controlling flow of emergency reactor coolant in said accumulator to said primary reactor cooling loop;
   a vortex fluid diode gas damper in said accumulator tank; and
   a gas release line disposed outside of said accumulator tank and having one end extending into said tank and connected to said damper for conducting pressurized gas in said accumulator outside for said tank.

2. The emergency reactor coolant accumulator as claimed in claim 1 and further comprising:
   a vertical pipe having a lower end connected to said gas damper and an upper end communicating with said pressurized gas in an upper portion of said tank for conducting said gas to said gas damper.

3. The emergency reactor coolant accumulator as claimed in claim 2 and further comprising:
   a lower inlet in said gas damper for the flow of accumulator water from said accumulator tank into said gas damper to produce vortex fluid flow in said gas damper and over said lower end of said vertical pipe to prevent flow of said gas through said vertical pipe into said gas damper when said inlet is below the level of accumulator coolant in said tank.

4. The emergency reactor coolant accumulator as claimed in claim 1 and further comprising:
   a second vortex fluid diode in said tank below said gas damper;
   an inlet for said second vortex fluid diode communicating with said accumulator coolant in said tank at a position below said gas damper;
   an outlet for said second vortex fluid diode communicating with said coolant injection pipe for conducting accumulator coolant from said accumulator tank to said coolant injection pipe; and
   a substantially vertical pipe having a lower end connected to said second vortex fluid diode and an upper end communicating with said accumulator coolant in said tank above said ga damper.

5. The emergency reactor coolant accumulator as claimed in claim 1 and further comprising:
   a pipe having a lower end connected to said gas damper and an upper end communicating with pressurized gas in said accumulator tank; and
   an inlet for said gas damper positioned at a level in said tank so that when the level of said accumulator coolant in said tank reaches a predetermined level said inlet of said gas damper communicates with said gas in said accumulator so that said gas is released through said pipe, said inlet, said gas damper and said gas release line.

6. The emergency reactor coolant accumulator as claimed in claim 4 wherein:
   said gas damper comprises a depressurizing vortex damper body;
   a lower inlet is provided in said damper body for flow of accumulator coolant from said tank into said depressurizing vortex damper body in a tangential direction to said damper body;
   a top inlet is provided in said vortex damper body communicating with said accumulator gas in said tank for the flow of said gas into said depressurizing vortex damper body when said accumulator coolant in said tank reaches a level below said lower inlet; and
   gas outlet means is provided communicating said depressurizing vortex damper body to said gas release line.

7. The emergency reactor coolant accumulator as claimed in claim 4 wherein:
   said second vortex fluid diode comprises a casing; and
   said outlet for said second vortex fluid diode is connected to a central portion of said casing.

8. An emergency reactor coolant accumulator for a primary reactor having a primary reactor cooling loop comprising:
   an accumulator tank having a bottom potion;
   an accumulator coolant injection pipe connected between said bottom portion of said accumulator tank and said primary reactor cooling loop;
   a check valve in said accumulator coolant injection pipe for controlling flow of emergency reactor coolant in said accumulator to said primary reactor cooling loop;
   a gas damper in said tank;
   a vortex fluid diode in said tank;
   a lower outlet for said vortex fluid diode communicating with said coolant injection pipe;
   a vertical pipe having a lower end connected to said vortex fluid diode and an upper end communicating with said accumulator coolant in said tank; and
   a gas release line disposed lustier of said accumulator tank and having on end extending into and connected to said damper for conducting pressurized gas in said accumulator outside of said tank.

* * * * *